United States Patent [19]

Hohenecker

[11] Patent Number: 4,934,790
[45] Date of Patent: Jun. 19, 1990

[54] DIAPHRAGM DRIVE MACROLENS CONVERTER

[75] Inventor: Harald Hohenecker, Vienna, Austria

[73] Assignee: Arri Cine+Video Gerate Gesellschaft M.B.H., Vienna, Austria

[21] Appl. No.: 231,484

[22] Filed: Aug. 12, 1988

[30] Foreign Application Priority Data

Mar. 16, 1988 [AT] Austria ................................... 705/88

[51] Int. Cl.⁵ ............................ G03B 9/02; G02B 7/11
[52] U.S. Cl. ................................. 350/255; 354/195.11; 354/271.1; 354/272
[58] Field of Search ............................ 350/252, 255; 354/195.11, 231, 271.1, 272

[56] References Cited

U.S. PATENT DOCUMENTS

| | | | |
|---|---|---|---|
| 3,906,529 | 9/1975 | Filipovich | 354/195.11 |
| 4,141,636 | 2/1979 | Shimojima | 354/195.11 |
| 4,227,791 | 10/1980 | Komoto | 354/195.11 |
| 4,258,996 | 3/1981 | Uesugi et al. | 354/195.11 |
| 4,695,144 | 9/1987 | Yoshino et al. | 354/195.11 |

Primary Examiner—Bruce Y. Arnold
Assistant Examiner—Martin Lerner
Attorney, Agent, or Firm—Cushman, Darby & Cushman

[57] ABSTRACT

In a macrolens having a distance setting ring, which is rotatively supported on the lens mount, and a lens component sliding longitudinally therethrough along the lens axis, as well as a diaphragm drive, it is proposed that for the automatic and smooth stop setting in accordance with the distance setting, the diaphragm drive, mounted on the longitudinal sliding lens component, be connected by means of a diaphragm drive pin to a converter, which is placed on the lens mount and is formed, for example, by a guide slot extending angularly to the lens axis, to convert the longitudinal motion of the lens component into a rotational motion of the diaphragm drive pin.

8 Claims, 8 Drawing Sheets

DIAPHRAGM DRIVE MACROLENS CONVERTER

BACKGROUND AND SUMMARY OF THE INVENTION

The invention relates to a macrolens having a distance setting ring rotatively supported on a lens mount, a lens component sliding longitudinally therethrough along the lens axis, and a diaphragm drive.

This type of macrolens has a known disadvantage in that the diaphragm ring must be operated manually while making reference to filter factor tables to determine a relation to the image scale. In many lenses, such a table is cut directly onto the lens barrel. Such a manual setting of the aperture, however, makes fast setting of the distance with a corresponding correct aperture setting to be practically impossible, especially in a movie camera. Moreover, only a few values can be accurately set when such tables are used, and the values lying therebetween must be estimated.

The invention has as its object the provision of a macrolens of the above-mentioned type, with which the aperture values corresponding to the focusing can be set automatically by means of a distance setting ring.

According to the invention, this object is achieved by providing a diaphragm drive on the longitudinally sliding lens component, and connecting the diaphragm drive by means of a diaphragm drive pin, to a converter mounted on the lens mount. This converter can be formed, for example, by a guide slot extending at an angle to the lens axis, which converts the longitudinal motion of the lens component into a rotational motion of the diaphragm drive pin. This extremely simple construction allows a fully automatic and smooth procedure and ensures absolute reliability in obtaining the correct exposure values for any desired distance setting. This results in the special advantage that, even with macrolenses of a movie camera, fast distance settings with the correct exposure values can be performed. To accomplish this objective, the converter must be so designed that, as the lens component slides along its axis by X mm, the diaphragm drive pin is displaced by set stop values corresponding to the change of distance. This conversion need not necessarily be a linear relation, so that the guide slot need not necessarily be straight lines.

Another variation of the invention is that the converter is formed by a diaphragm sleeve, which has many advantageous characteristics. First, the diaphragm sleeve is rotatively supported between the lens component and a lens barrel. The diaphragm sleeve is connected to the diaphragm drive pin; the diaphragm sleeve has a guide pin—non-rotatively fitted into a guide slot provided on the interior of the lens mount—located in the end section of the diaphragm sleeve opposite the diaphragm drive pin. The advantage of such a variation is that the converter is transferred from the spatially confined area of the diaphragm drive, and the lens component located in the lens barrel, to the free region between lens cap and lens.

Another variation of the invention is that the diaphragm ring is rotatively connected to the rotatively supported diaphragm sleeve coaxially to the lens axis via the guide slot or longitudinal slot, which extends at an angle to the lens axis. Such an approach enables automatic aperture control by the converter, as well as manual aperture control by the diaphragm ring, as before.

Yet another variation of the invention has the diaphragm sleeve mounted in radial direction coaxially inside the correction sleeve, and has a conical extension of the diaphragm sleeve in the range thereof. This conical extension of the diaphragm sleeve has no deleterious effect on the incidence of light on the lens component.

Another variation of the invention uses a no-sag spring mounted in the interface between the correction sleeve and the lens mount. The spring counteracts the reactive force exerted by the guide pin on the correction sleeve as the guide pin moves in the guide slot. This variation ensures that, as the lens component moves along its axis, causing the diaphragm sleeve to move along its axis, the converter, which is formed by the longitudinal slot in the correction sleeve and the guide pin on the diaphragm sleeve, provides the rotation of the diaphragm sleeve together with the diaphragm drive pin, without rotation of the correction sleeve. The increased friction caused by the no-sag spring can be easily overcome by the manual setting of the aperture values.

Another variation of the invention is that the converter is formed by a groove located on the diaphragm sleeve which extends longitudinally through the lens component and at an angle to the lens axis, in which groove is guided a guide pin connected to the diaphragm ring or to the lens mount. Such a variation of the invention is as practicable and purposeful as the converters described earlier.

Note that the aforementioned construction of the converter cannot be used in all lenses.

Present-day lenses are operated with "floating elements". They have several lens components which, during focusing, may move at different speeds, or may be stationary. Many times, the aperture is connected to the stationary lens component, so that no correction movement can be derived from the diaphragm sleeve coupled therewith.

In this case, it is advantageous to control the correction by another lens component, which is usually the first lens component that is turned toward the lens. In a modification of the invention involving the use of lenses relating to the invention, there may be provided, as a converter inside the lens mount, two coaxially extending sleeves that are fitted into each other and each of which is formed with a longitudinal slot: one sleeve is connected to the diaphragm drive pin coupled to the aperture, whereby its longitudinal slot is provided at an angle to the lens axis; the other sleeve is connected to a manually adjustable diaphragm ring, whereby its longitudinal slot is provided parallel to the lens axis. A follower pin connected to a longitudinally adjustable lens is passed through both longitudinal slots.

Using this special construction, the appropriate aperture control can be carried out advantageously with automatic and smooth focusing, so that faulty aperture settings can be avoided. The follower pin connected to the lens component and passing through both longitudinal slots causes the rotation of the sleeve connected to the diaphragm drive, and which has its longitudinal slot at an angle toward the lens axis. The angle of this longitudinal slot with respect to the lens axis is such that the longitudinal displacement of the lens component corresponds to the amount of correction necessary to obtain the correct aperture value at the new distance setting. The displacement path defined by the longitudinal slot at an angle to the lens axis need not necessarily be a linear line corresponding to a linear stop setting. In the case of a nonlinear ratio between distance setting and stop setting, especially in lenses with lens components that move relatively to each other, the longitudinal slot may also be formed as an appropriate curve.

One variation of the invention provides that the radially outer sleeve is rotatively connected to the diaphragm ring, and the radially inner sleeve, which is connected to the diaphragm drive pin, is rotatively supported within the outer sleeve, and the follower pin is rotatively supported on the lens component. By virtue of this construction, the diaphragm setting for the chosen exposure can be manually set, whereby the rotational motion is transferred from the diaphragm ring to the outer sleeve, from the outer sleeve by means of the follower pin to the inner sleeve, and from the inner sleeve to the diaphragm drive. Since the follower pin is rotatively supported, this rotational motion can be carried out independent of the particular longitudinal position of the follower pin or of the lens component.

Another variation of the invention provides that the largest tangential distance between the two longitudinal slots be formed such as to correspond to the largest possible path of adjustment of the diaphragm drive pin, the length of the longitudinal slots corresponding to the largest possible longitudinal path of adjustment of the lens component. Such a formation of the longitudinal slots ensures the automatic conversion of the longitudinal motion of the lens component into a rotational motion throughout the entire region for distance setting.

Another variation of the invention provides that a no-sag spring or highly viscous grease be placed between the end face of the radially outer sleeve and the lens mount. This structure makes it more difficult for the outer sleeve—and easier for the inner sleeve—to turn. In this way, it is ensured that the follower pin, as it is moving in the longitudinal slots along its axis, forces the inner sleeve to rotate, while the reactive force exerted by the inner sleeve on the follower pin, which transmits the reactive force to the outer sleeve, is absorbed by the no-sag spring or by the highly viscous grease, thereby preventing the outer sleeve from rotating.

Finally, another variation of the invention consists of mounting both longitudinal slots and the guide pin in symmetric relation to a longitudinal symmetry plane of the lens. This double arrangement of diametrically opposed guide slots and follower pins results in a uniform transfer of forces and, thereby, an accurate diaphragm setting.

BRIEF DESCRIPTION OF THE DRAWINGS

The invention will now be described with reference to embodiments of the invention in conjunction with the accompanying drawing, in which.

DESCRIPTION OF THE PREFERRED EMBODIMENT

Figure 1:
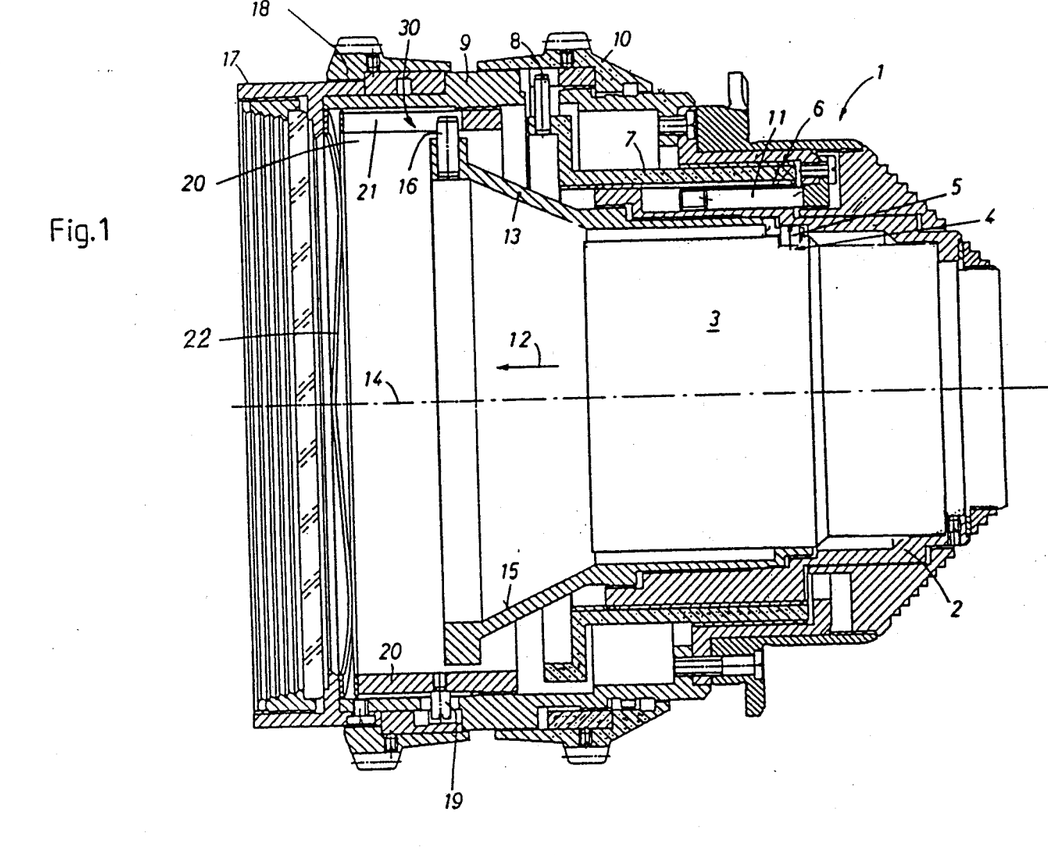
FIG. 1 is a longitudinal cross-sectional view of a macrolens incorporating the invention, taken along the lens axis.

The macrolens illustrated in FIG. 1 includes a lens component 3 mounted in a lens barrel 2, which has a diaphragm drive pin 5 rotatively attached to the lens barrel. The lens barrel 2 is formed with a threaded area 6 and is connected thereby to a threaded sleeve 7, which itself is connected by a pin 8 to a distance ring 10 rotatively supported on a lens mount 9. In this way, by rotating the distance ring 10, the lens component 3, which is prevented from rotating by slot-and-feather joints (not shown), can be moved in the direction indicated by arrows 12, over a range from the position on the camera side to the end position on the lens side (indicated by the head of arrow 12).

A diaphragm sleeve 13 is rotatively supported inside the lens barrel 2 coaxial to the lens axis 14. This diaphragm sleeve 13 has, on the lens side, a conical extension 15, to which is attached a guide pin 16 which protrudes outwardly in a radial direction. The diaphragm sleeve 13 is non-rotatably connected to the diaphragm drive pin 5 in its end region on the camera side. A diaphragm ring 18 is rotatively supported on the lens mount 9 in the lens side end region 17 of the macrolens 1. This diaphragm ring 18 is connected by means of a pin 19 to a rotatively supported correction sleeve 20 coaxially to the lens axis 14. This correction sleeve 20 has a guide slot or longitudinal slot 21 extending at an angle to the lens axis 14, into which the guide pin 16 is inserted or guided. A no-sag spring 22 is provided between the end face region of the correction sleeve 21 on the lens side and the lens mount 9.

Figure 2:
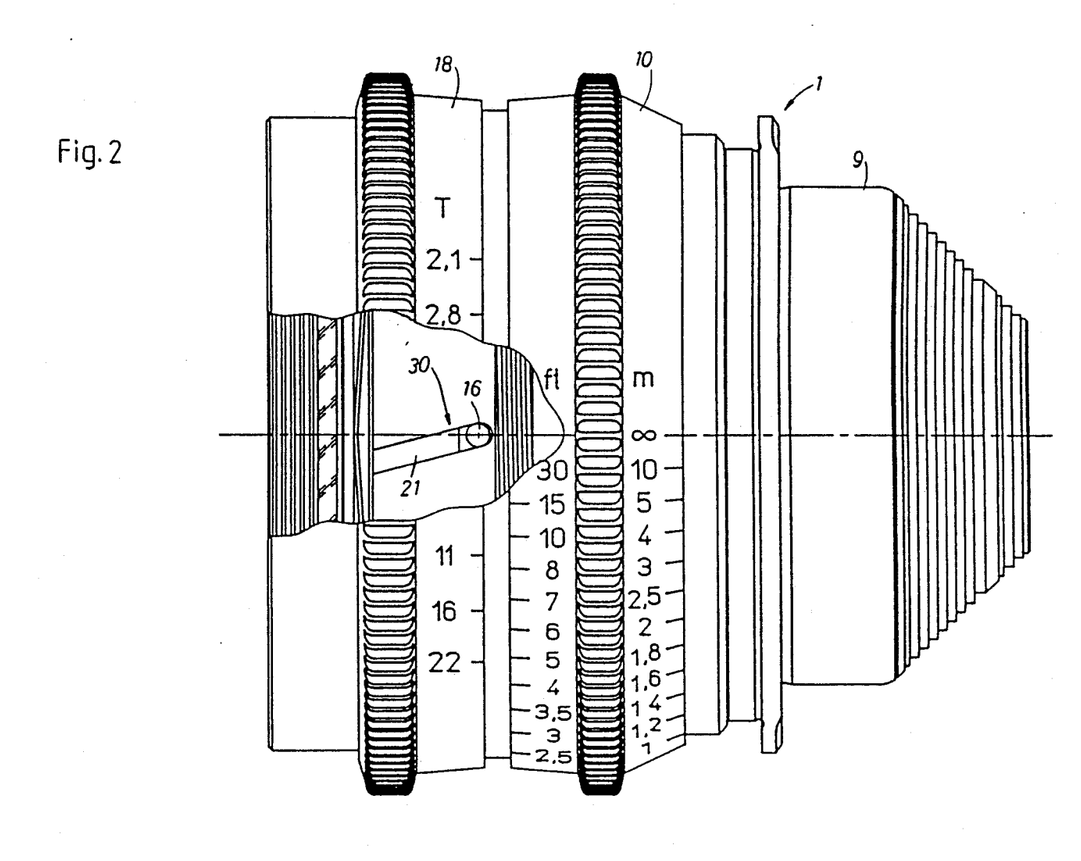
FIG. 2 is a top plan view of the macrolens shown in FIG. 1.

FIG. 2 shows that when the distance ring 10 is rotated from the infinity range to the macro range, this rotational motion is transferred to pin 8 and threaded sleeve 7 to thread 6 and to lens barrel 2. These structures move together. The lens component 3, as well as the diaphragm sleeve 13 and the diaphragm drive pin 5, which are rotatively attached to lens component 3, move in the direction indicated by the arrow 12 to the end of the macrolens 1 on the lens side. This longitudinal motion is converted by the converter 30—which is formed by the guide slot 21 and the guide pin 16—from a parallel motion into a rotational motion about the lens axis 14. Since the guide pin 16 is attached to the diaphragm sleeve 13, which is attached to the diaphragm drive pin 5, this rotational motion of guide pin 16 results in a rotation of the diaphragm drive pin 5 and thereby producing a diaphragm setting corresponding to the particular distance setting and position of the lens component 3. The action inducing the rotational motion of the diaphragm sleeve 13 also causes a reactive force exerted by the guide pin 16, which acts in the opposite direction on the correction sleeve 20, which by itself would rotate the correction sleeve 20 in the opposite direction. In order to prevent such opposite direction rotation, the reactive force exerted on the correction sleeve 20 is counterbalanced by an increased rotational frictional force from a no-sag spring 22. When the distance ring 10 rotates in the opposite direction (that is from the macro range toward the infinity range), there follows a longitudinal motion of the lens component 3 counter to the direction of the arrow 12, to the end of the macrolens 1 on the camera side. Here again, there occurs a diaphragm setting that corresponds to this distance setting, during which the diaphragm sleeve 13 and diaphragm drive pin 5 are rotated together with the guide pin 16.

The diaphragm setting can also be carried out manually by means of the diaphragm ring 18, during which the rotational motion is transferred via the pin 19 to the correction sleeve 20 while overcoming the frictional force caused by the no-sag spring 22. The correction sleeve 20 transmits the rotational movement via the guide pin 16 in guiding slot 21 to the diaphragm sleeve 13, by means of which the diaphragm drive pin 5 is rotated appropriately.

Figure 3:
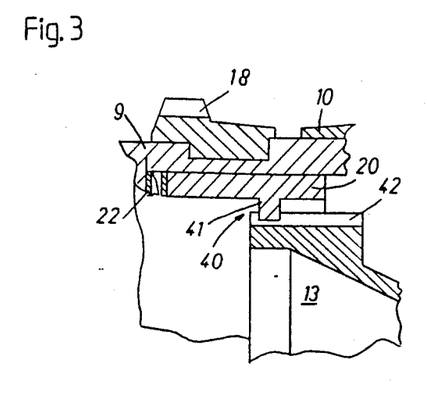
FIG. 3 is a longitudinal cross-sectional view of another macrolens embodying the invention.

In the practical embodiment shown in FIG. 3, the converter 40 is formed by a pivot 41 connected to the correction sleeve and by a groove 42, which guides pivot 41 and is connected to the diaphragm sleeve 13.

Lenses of modern design operate with "floating elements" which, during distance setting, are displaced with varying force, whereby a lens component may also be stationary. Many times, the diaphragm is connected to this stationary lens component, so that no correcting motion can be derived from the diaphragm sleeve coupled therewith.

In this case, it is advantageous to control the correction of another lens component, whereby in most cases the first lens component that is turned toward the lens is the most suitable.

Practical embodiments of the invention for such lenses will be described with reference to FIGS. 4 to 8.

Figure 4:
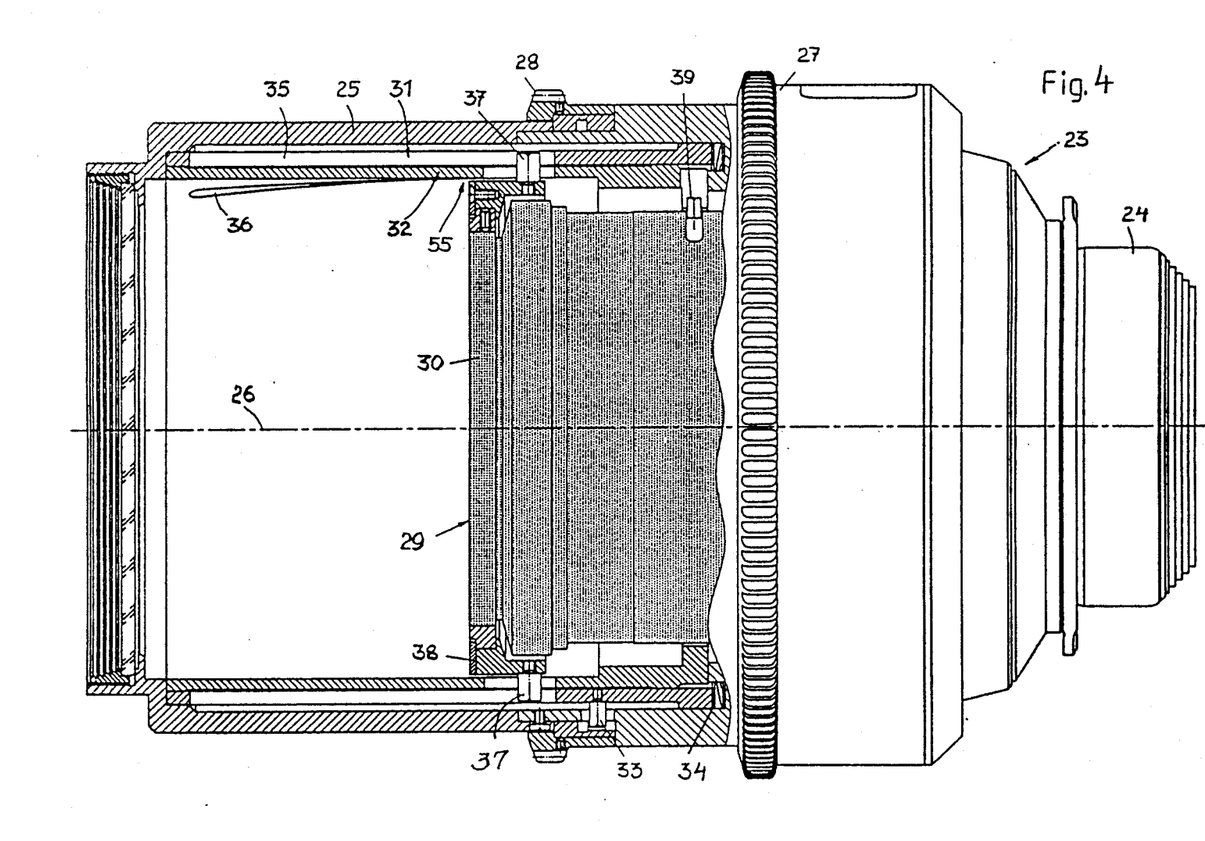
FIG. 4 shows a longitudinal cross-sectional view of another macrolens incorporating the invention, taken along the lens axis.
Figure 5:
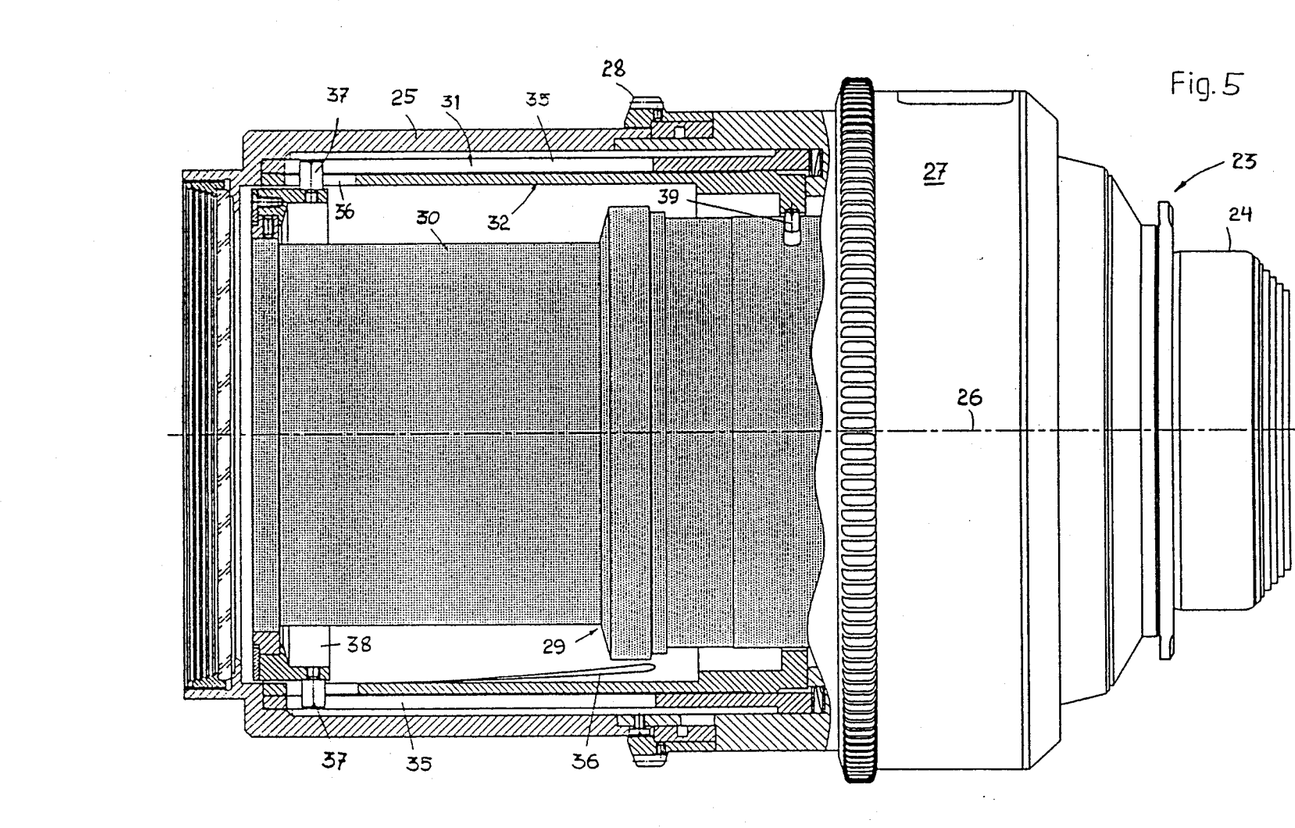
FIG. 5 is also a longitudinal cross-sectional view of the macrolens depicted in FIG. 4, with the lens component being in a different position.

The macrolens shown in FIGS. 4 and 5 is essentially made up of a screw cap or a bayonet joint 24 fitted to the camera opening and a cylindrical lens mounting 25 with a lens axis 26, and on which a distance ring 27 and a diaphragm ring 28 are mounted to rotate about the lens axis 26. A lens system 29 is disposed inside the lens mount 25 and includes a lens component 30 that can be set by means of the distance ring 27 to a position along the lens axis 26. Two cylindrical sleeves 31 and 32 are arranged coaxially to the lens axis 26 between the lens 23 and the cylindrical lens mount 25. The radially outer sleeve 31 is connected by means of a pin 33 to the diaphragm ring 28. No-sag spring 22 is provided on one end face of the outer sleeve 31, which is supported on the other side of the lens mount 25. The radially outer sleeve 31 has in diametrically opposed regions longitudinal slots 35 in parallel with the lens axis 26. The radially inner sleeve 32 also has in diametrically opposed regions a longitudinal sleeve 36 which extends at an angle to the longitudinal slot 35 and to the lens axis 26. The two sleeves 31 and 32 form together with a follower pin 37 a converter 55 to transform the longitudinal motion of the lens component into a rotational motion to the diaphragm drive. The follower pin 37 passes through the two longitudinal slots 35 and 36, and is fastened with its radially inner end to a thrust ring 38 rotatively supported on the lens component 30. The inner sleeve 32 is rotatably connected by means of a diaphragm drive pin 39 to a diaphragm drive for the aperture setting (not shown in detail).

Figure 6:
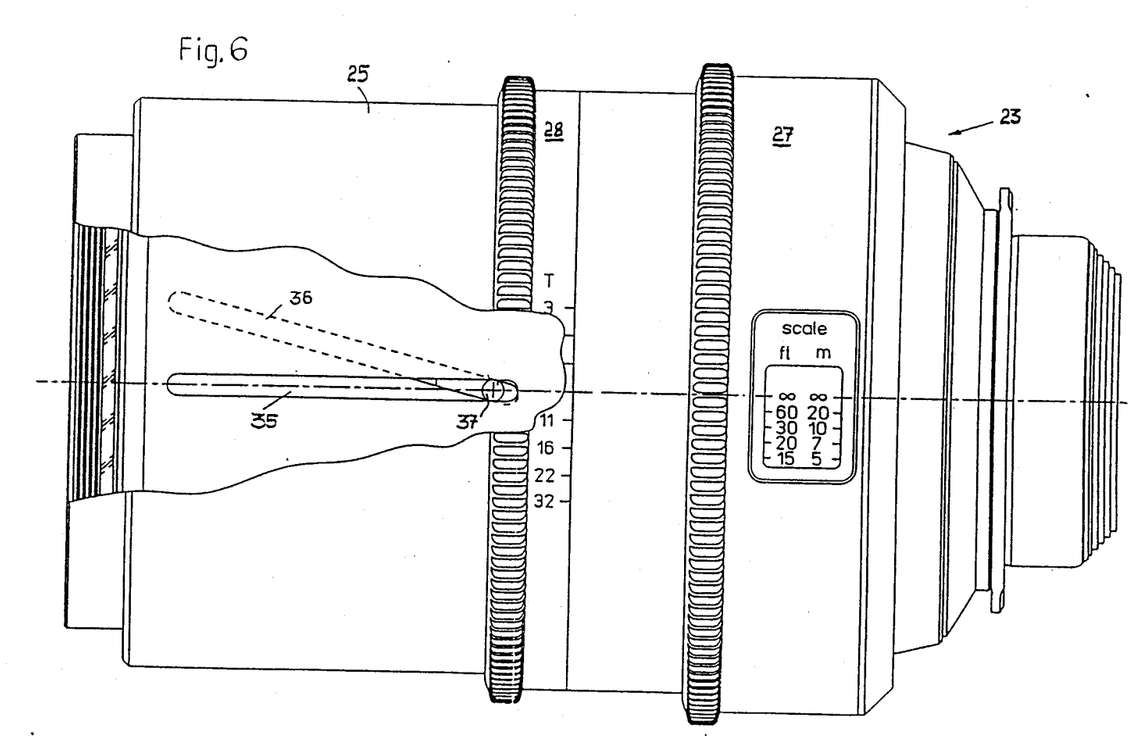
FIGS. 6 and 7 are top plan views of the macrolens of FIG. 4.

In the position shown in FIGS. 4 and 6, the distance ring is focused to infinity and the longitudinally moving lens 30 is driven completely into its position within the stationary lens component. The follower pin 37 is located in its innermost position adjacent to the diaphragm ring 28 in the two longitudinal slots 35 and 36. The diaphragm is focused at infinity. As soon as the distance ring 27 is rotated towards the macro range, there follows an appropriate longitudinal displacement of the lens component 30 along the lens axis 26. This causes a longitudinal displacement of the two follower pins 37 which are connected, via the thrust ring 38, to the lens component 30. These follower pins cause the radially inner sleeve 32 to rotate in accordance with the mark of the longitudinal displacement. This rotation is caused by the translation of the longitudinal displacement of the follower pins 37, parallel to the lens axis 26, to the displacement along the longitudinal slot 36, which is at an angle to the lens axis 26. The frictional force of the no-sag spring 34 counterbalances any reactive force exerted by the inner sleeve 32 onto the follower pins 37 (which transfer the force via longitudinal slot 35 to the outer sleeve 31), thereby preventing the outer sleeve 31 from rotating due to the reactive forces of the inner sleeve 32. The new diaphragm drive setting is determined by the angle of rotation of the inner sleeve 32, so that a change in the distance setting by the distance setting ring 27 results in a corresponding change in the aperture setting by the diaphragm drive pin 39. Independent of this automatic setting of the aperture value, the diaphragm can also be set manually at any time by rotating the diaphragm ring 28. Rotation of the diaphragm ring 28 is transferred to the outer sleeve 31 by means of pin 33, which transfers the rotational motion via the two follower pins 37 to the radially inner sleeve, from which, in turn, the rotational motion is transmitted by means of the diaphragm drive pin 39 to the diaphragm drive.

Figure 7:
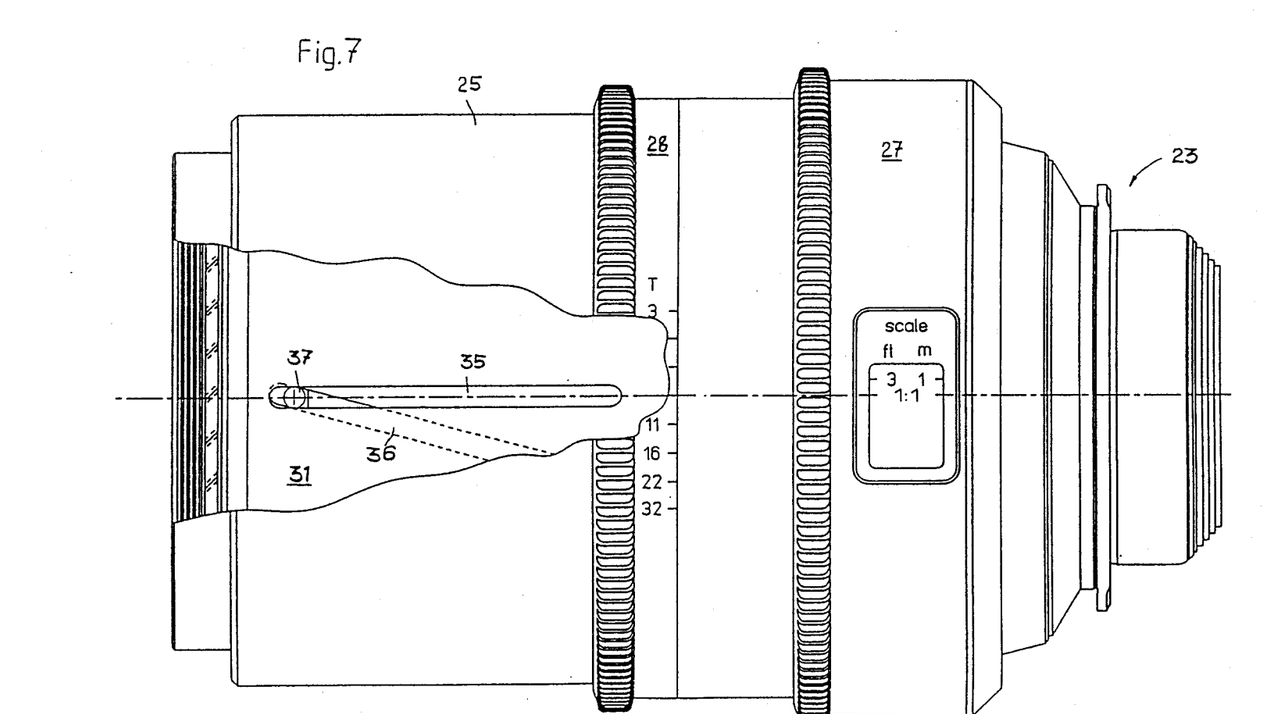

FIGS. 5 and 7 show the frontmost end position of the lens component 30, in which the largest macro range and the largest possible diaphragm setting are achieved. When the lens component 30 is commanded to move back toward infinity by a setting of the distance ring 27, the diaphragm is set automatically and smoothly by the two longitudinal slots 35, 36 and the follower pin 37. The angle enclosed by the two longitudinal slots 35, 36 corresponds to the required conversion of the longitudinal displacement of the lens component 30 into an appropriate rotational motion of the diaphragm drive pin 39 for a aperture setting value that is suitable for the corresponding distance setting. That is to say, the angle to the lens axis 26 of the longitudinal slot 36 must be such that, when the lens component 30 moves by a specific linear measure, the diaphragm drive is set by aperture values that correspond to this longitudinal setting. No linear conformity with any relation is required: the path of adjustment for the follower pin 37, which is defined by the oblique longitudinal slot 36, need not be a straight line. Non-linearity prevails especially in lenses having components that move relative to each other, so that for a diaphragm setting adjusted to the longitudinal motion, the longitudinal slot 36 may be formed in an appropriate curve.

Figure 8:
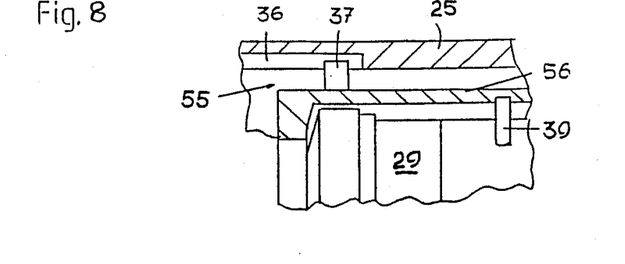
FIG. 8 is another practical embodiment of a converter of the invention.

In FIG. 8, a converter 55 is formed by the longitudinal slot 36, which is provided on the interior of the lens mount and in which the follower pin 37 is guided. This follower pin 37 is connected to a sleeve 56, which is rotatively supported on the lens system 29 and is connected to the diaphragm drive pin 39.

What is claimed is:

1. A macro lens assembly comprising:

(a) a movable lens component mounted to have a movement in a direction along a lens axis;
(b) distance setting means for setting a lens distance by controlling said movement of said lens component;
(c) a diaphragm drive, adjustable to a setting; and
(d) converting means for converting said movement of said lens component along said lens axis into a corresponding movement in another direction, and coupling said movement in said another direction to said diaphragm drive to adjust said setting thereof;
(e) first means for actuating a manual adjustment of said diaphragm drive to a setting;
(f) friction-producing means, coupled between said first means and said diaphragm drive, for controlling said first means during said corresponding movement in said another direction, wherein said friction-producing means permits said first means to adjust said diaphragm drive only when said first means is actuated to adjust said diaphragm drive, wherein said converting means is comprised of second means for providing a path of movement at an angle to said lens axis which converts said movement of said lens component into said corresponding movement in another direction, wherein said direction is a rotational motion about said lens axis;
(g) wherein said distance setting means is comprised of:
 (1) a rotatively supported distance setting ring mounted coaxially to said lens axis;
 (2) a threaded sleeve, connected to said distance setting ring to be rotated thereby; and
 (3) a threaded lens barrel in which said movable lens component is mounted in a way such that said movement of said movable lens component is provided by a movement os aid threaded lens barrel along said lens axis, wherein said movement of said threaded lens barrel is controlled by said rotating of said threaded sleeve; and
(h) said second means is comprised of:
 (1) a correction sleeve connected to said first means;
 (2) a diaphragm sleeve rotatively attached to said threaded lens barrel, wherein said diaphragm drive is connected to said diaphragm sleeve in order to control said diaphragm drive by a rotational motion above said lens axis of said diaphragm sleeve; and
 (3) means connecting said diaphragm sleeve to said correction sleeve for controlling said rotation of said diaphragm sleeve.

2. A macro-lens assembly as recited in claim 1, wherein:
(a) said correction sleeve is formed with a guide slot at an angle to said lens axis; and
(b) said means to connect said diaphragm sleeve to said correction sleeve is comprised of a guide pin which protrudes outwardly in a radial direction, attached to said diaphragm sleeve, wherein said guide pin is inserted into and guided by said guide slot.

3. A macro-lens assembly as recited in claim 1, wherein:
(a) a said diaphragm sleeve is formed with a groove at an angle to said lens axis; and
(b) said means connecting said diaphragm sleeve to said correction sleeve is comprised of a pivot which protrudes inwardly in a radial direction, attached to said correction sleeve, wherein said pivot is inserted into and guided by said groove.

4. A macro lens assembly comprising:
(a) a movable lens component mounted to have a movement in a direction along a lens axis;
(b) distance setting means for setting a lens distance by controlling said movement of said lens component;
(c) a diaphragm drive, adjustable to a setting; and
(d) converting means for converting said movement of said lens component along said lens axis into a corresponding movement in another direction, and coupling said movement in said another direction to said diaphragm drive to adjust said setting thereof;
(e) first means for a manual adjustment of said diaphragm drive to a setting;
(f) friction-producing means, coupled between said first means and said diaphragm drive, for controlling said first means during said corresponding movement in said another direction, wherein said friction-producing means permits said first means to adjust said diaphragm drive only when said first means is actuated to adjust said diaphragm drive, wherein said converting means is comprised of second means for providing a path of movement at an angle to said lens axis which converts said movement of said lens component into said corresponding movement in another direction, wherein said direction is a rotational motion about said lens axis;
(g) wherein said second means for providing a path of movement is comprised of:
 (1) two follower pins, connected to said movable lens component and diametrically opposed to one another; and
 (2) a rotatively-supported inner sleeve which has surfaces that form two diametrically opposed guide slots at an angle to said lens axis, wherein said follower pins are located in said guide slots, thereby controlling rotation of said inner sleeve, and wherein said inner sleeve is connected to said diaphragm drive, thereby adjusting said diaphragm drive by said rotation of said inner sleeve;
(h) wherein said means for manually adjusting said diaphragm drive is comprised of:
 (1) a rotatively-supported diaphragm ring mounted coaxially to said lens axis and connected to a rotatively-supported outer sleeve, wherein said outer sleeve is formed with a longitudinal slot parallel to said lens axis; and
(i) said follower pins located in and guided by said longitudinal slot parallel to said lens axis.

5. A macro lens assembly comprising:
(a) a movable lens component mounted to have a movement in a direction along a lens axis;
(b) distance setting means for setting a lens distance by controlling said movement of said lens component;
(c) a diaphragm drive, adjustable to a setting; and
(d) converting means for converting said movement of said lens component along said lens axis into a corresponding movement in another direction, and coupling said movement in said another direction to said diaphragm drive to adjust said setting thereof;

wherein said converting means is comprised of means for providing a path of movement at an angle to said lens axis which converts said movement of said lens component into said corresponding movement in another direction, wherein said another direction is a rotational motion about said lens axis;

(e) said means for providing a path of movement is comprised of:
(1) a sleeve which is rotatively supported on said movable lens component, wherein a rotation of said sleeve adjusts said diaphragm drive to said setting;
(2) two follower pins, connected to said sleeve and diametrically opposed to one another, wherein said follower pins protrude outwardly in a radial direction; and
(3) two longitudinal slots at an angle to said lens axis, located on the interior of a lens mount, and diametrically opposed to one another, wherein said follower pins are located in said slots, thereby controlling said rotation of said sleeve.

6. A macro-lens assembly, comprising:
(a) a movable lens component mounted to have a movement in a direction along lens axis;
(b) distance setting means for setting a lens distance by controlling said movement of said lens component;
(c) a diaphragm drive, adjustable to a setting;
(d) means for manually adjusting said diaphragm drive to a setting;
(e) converting means for converting said movement of said lens component along said lens axis into a corresponding movement in another direction, and coupling said movement in said another direction to said diaphragm drive to adjust said setting thereof; and
(f) friction-producing means, coupled between said means for manually adjusting said diaphragm and said diaphragm drive, for preventing said means for manually adjusting said setting from moving is said another direction during said corresponding movement in said another direction so that said means for manually adjusting is not moved by said movement of said diaphragm drive.

7. A macro-lens assembly as recited in claim 6, wherein said converting means is comprised of means for providing a path of movement at an angle to said lens axis which converts said movement of said lens component into said corresponding movement in another direction, wherein said another direction is a rotational motion about said lens axis.

8. A method for adjusting a setting on a diaphragm drive during movement of a lens component in a direction along a lens axis, which comprises the steps of:
(a) actuating a control of a movement of said lens component along said lens axis;
(b) converting said movement of said lens component along said lens axis into a corresponding movement in another direction;
(c) coupling said movement in said another direction to said diaphragm drive to adjust said setting of said diaphragm drive;
(d) providing manual adjustment of said setting on said diaphragm drive;
(e) producing friction to prevent said manual adjustment of said setting from moving during said movement in said another direction; and
(f) permitting said manual adjustment only when there is a command to manually adjust said setting on said diaphragm drive.

* * * * *